United States Patent
Zheng et al.

(10) Patent No.: US 10,952,193 B2
(45) Date of Patent: Mar. 16, 2021

(54) LTE-TDD CARRIER AGGREGATION ENHANCEMENT FOR HALF-DUPLEX UES

(71) Applicants: Ruiming Zheng, Beijing (CN); Chao Wei, Beijing (CN); QUALCOMM Incorporated, San Diego, CA (US)

(72) Inventors: Ruiming Zheng, Beijing (CN); Chao Wei, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/063,126

(22) PCT Filed: Mar. 13, 2015

(86) PCT No.: PCT/CN2015/074195
§ 371 (c)(1),
(2) Date: Mar. 7, 2016

(87) PCT Pub. No.: WO2016/145568
PCT Pub. Date: Sep. 22, 2016

(65) Prior Publication Data
US 2018/0007663 A1 Jan. 4, 2018

(51) Int. Cl.
*H04W 72/04* (2009.01)
*H04L 5/00* (2006.01)
*H04L 5/14* (2006.01)

(52) U.S. Cl.
CPC ......... *H04W 72/042* (2013.01); *H04L 5/0094* (2013.01); *H04L 5/1438* (2013.01); *H04L 5/1469* (2013.01); *H04L 5/001* (2013.01)

(58) Field of Classification Search
CPC .............. H04L 5/001; H04L 5/16; H04J 3/00
See application file for complete search history.

(56) References Cited

U.S. PATENT DOCUMENTS

| | | | |
|---|---|---|---|
| 2012/0314652 A1* | 12/2012 | Ahn | H04W 74/085 370/328 |
| 2012/0327797 A1 | 12/2012 | Siomina et al. | |
| 2012/0327821 A1* | 12/2012 | Lin | H04W 72/048 370/280 |

(Continued)

FOREIGN PATENT DOCUMENTS

CN 104412525 A 3/2015

OTHER PUBLICATIONS

International Search Report and Written Opinion—PCT/CN2015/074195—ISA/EPO—dated Dec. 14, 2015.

*Primary Examiner* — Elton Williams
(74) *Attorney, Agent, or Firm* — Norton Rose Fulbright LLP

(57) ABSTRACT

Enhancement of long term evolution (LTE) time division duplex (TDD) carrier aggregation for half duplex user equipments (UEs) is discussed. In one aspect of enhanced TDD carrier aggregation, the UE monitoring for a control signal indicating subframe configuration for each TDD cell of an aggregated set of TDD cells in the same band. The UE may determine the downlink subframes and receive downlink transmissions on such subframes based on the control signal. In another aspect, the UE compares the number of scheduled uplink and downlink subframes between the TDD cells in the same band to determine the downlink error-control messaging timing for each cell.

28 Claims, 16 Drawing Sheets

(56) References Cited

U.S. PATENT DOCUMENTS

2013/0242799 A1\* 9/2013 Yin ...................... H04L 1/1861
  370/254
2013/0308550 A1 11/2013 Yin et al.
2015/0023231 A1\* 1/2015 Ji ........................ H04B 7/2643
  370/280
2016/0029231 A1\* 1/2016 Kazmi ............. H04W 72/1226
  370/252

\* cited by examiner

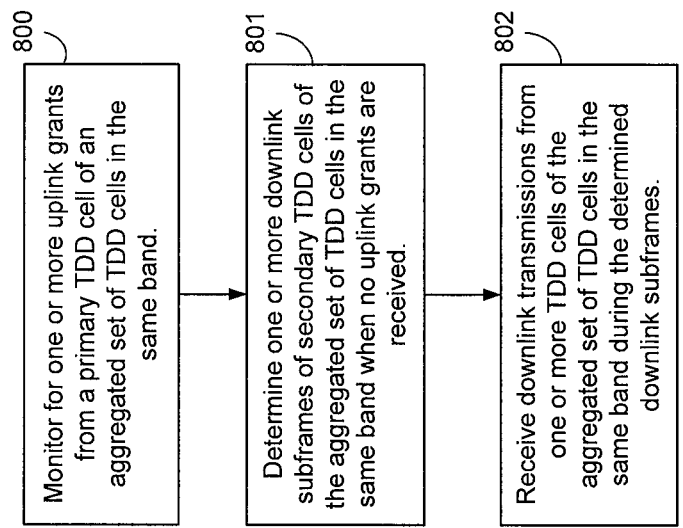
Fig. 8
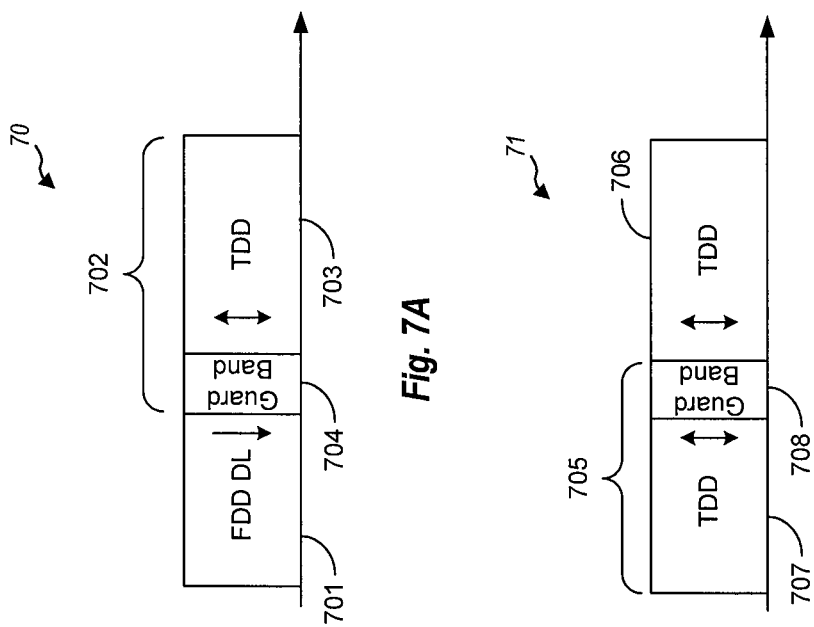
Fig. 7A
Fig. 7B

LTE-TDD CARRIER AGGREGATION ENHANCEMENT FOR HALF-DUPLEX UES

PRIORITY CLAIM TO RELATED APPLICATIONS

This application is a national phase application under 35 U.S.C. § 371 of International Application No. PCT/CN2015/074195, filed on Mar. 13, 2015. The entire content of the above-referenced disclosure is incorporated herein by reference without disclaimer.

BACKGROUND

Field

Aspects of the present disclosure relate generally to wireless communication systems, and more particularly to long term evolution (LTE) time division duplex (TDD) carrier aggregation enhancement for half duplex user equipments (UEs).

Background

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

In one aspect of the present disclosure, a method of wireless communication includes monitoring for a control signal indicating subframe configuration for each time division duplex (TDD) cell of an aggregated set of TDD cells in the same band, wherein at least one TDD cell of the aggregated set has a different uplink-downlink configuration than at least one other TDD cell of the aggregated set, determining one or more downlink subframes of the aggregated set based on the control signal in response to detecting the control signal, and receiving downlink transmissions from one or more TDD cells of the aggregated set during the determined downlink subframes.

In a further aspect of the present disclosure, a method of wireless communication includes receiving a broadcast message indicating a first subframe configuration of a primary cell and a second subframe configuration for one or more secondary cells in the same band as the primary cell, and in response to a number of secondary cell downlink subframes being greater than or equal to a number of primary cell downlink subframes: determining a downlink error-control messaging timing for the primary cell and the secondary cells based on the second subframe configuration, and determining an uplink error-control messaging timing for the primary cell and the secondary cells based on the first subframe configuration, and in response to a number of secondary cell uplink subframes of the secondary cells being greater than or equal to a number of primary cell uplink subframes of the primary cell: determining the downlink error-control messaging timing for the primary cell and the secondary cells based on the first subframe configuration, and determining the uplink error-control messaging timing for the primary cell and the secondary cells based on the second subframe configuration. The method further includes conducting error-control messaging according to the downlink error-control messaging timing and the uplink error-control messaging timing.

In a further aspect of the present disclosure, an apparatus configured for wireless communication includes means for monitoring for a control signal indicating subframe configuration for each time division duplex (TDD) cell of an aggregated set of TDD cells in the same band, wherein at least one TDD cell of the aggregated set has a different uplink-downlink configuration than at least one other TDD cell of the aggregated set, means for determining one or more downlink subframes of the aggregated set based on the control signal in response to detecting the control signal, and means for receiving downlink transmissions from one or more TDD cells of the aggregated set during the determined downlink subframes.

In a further aspect of the present disclosure, an apparatus configured for wireless communication includes means for receiving a broadcast message indicating a first subframe configuration of a primary cell and a second subframe configuration for one or more secondary cells in the same band as the primary cell, and means, executable in response to a number of secondary cell downlink subframes being greater than or equal to a number of primary cell downlink subframes: for determining a downlink error-control messaging timing for the primary cell and the secondary cells based on the second subframe configuration, and for determining an uplink error-control messaging timing for the primary cell and the secondary cells based on the first subframe configuration, and means, executable in response to a number of secondary cell uplink subframes of the secondary cells being greater than or equal to a number of primary cell uplink subframes of the primary cell: for determining the downlink error-control messaging timing for the primary cell and the secondary cells based on the first subframe configuration, and for determining the uplink error-control messaging timing for the primary cell and the secondary cells based on the second subframe configuration. The apparatus further includes means for conducting error-control messaging according to the downlink error-control messaging timing and the uplink error-control messaging timing.

In a further aspect of the present disclosure, a computer-readable medium having program code recorded thereon. This program code includes code to monitor for a control signal indicating subframe configuration for each time division duplex (TDD) cell of an aggregated set of TDD cells in the same band, wherein at least one TDD cell of the aggregated set has a different uplink-downlink configuration than at least one other TDD cell of the aggregated set, code to determine one or more downlink subframes of the aggregated set based on the control signal in response to detecting the control signal, and code to receive downlink transmissions from one or more TDD cells of the aggregated set during the determined downlink subframes.

In a further aspect of the present disclosure, a computer-readable medium having program code recorded thereon. This program code includes code to receive a broadcast message indicating a first subframe configuration of a primary cell and a second subframe configuration for one or more secondary cells in the same band as the primary cell, and code, executable in response to a number of secondary cell downlink subframes being greater than or equal to a number of primary cell downlink subframes: to determine a downlink error-control messaging timing for the primary cell and the secondary cells based on the second subframe configuration, and to determine an uplink error-control messaging timing for the primary cell and the secondary cells based on the first subframe configuration, and code, executable in response to a number of secondary cell uplink subframes of the secondary cells being greater than or equal to a number of primary cell uplink subframes of the primary cell: to determine the downlink error-control messaging timing for the primary cell and the secondary cells based on the first subframe configuration, and to determine the uplink error-control messaging timing for the primary cell and the secondary cells based on the second subframe configuration. The program code further includes code to conduct error-control messaging according to the downlink error-control messaging timing and the uplink error-control messaging timing.

In a further aspect of the present disclosure, an apparatus includes at least one processor and a memory coupled to the processor. The processor is configured to monitor for a control signal indicating subframe configuration for each time division duplex (TDD) cell of an aggregated set of TDD cells in the same band, wherein at least one TDD cell of the aggregated set has a different uplink-downlink configuration than at least one other TDD cell of the aggregated set, to determine one or more downlink subframes of the aggregated set based on the control signal in response to detecting the control signal, and to receive downlink transmissions from one or more TDD cells of the aggregated set during the determined downlink subframes.

In a further aspect of the present disclosure, an apparatus includes at least one processor and a memory coupled to the processor. The processor is configured to receive a broadcast message indicating a first subframe configuration of a primary cell and a second subframe configuration for one or more secondary cells in the same band as the primary cell, and in response to a number of secondary cell downlink subframes being greater than or equal to a number of primary cell downlink subframes: to determine a downlink error-control messaging timing for the primary cell and the secondary cells based on the second subframe configuration, and to determine an uplink error-control messaging timing for the primary cell and the secondary cells based on the first subframe configuration, and in response to a number of secondary cell uplink subframes of the secondary cells being greater than or equal to a number of primary cell uplink subframes of the primary cell: to determine the downlink error-control messaging timing for the primary cell and the secondary cells based on the first subframe configuration, and to determine the uplink error-control messaging timing for the primary cell and the secondary cells based on the second subframe configuration. The apparatus further includes configuration of the processor to conduct error-control messaging according to the downlink error-control messaging timing and the uplink error-control messaging timing.

This has outlined, rather broadly, the features and technical advantages of the present disclosure in order that the detailed description that follows may be better understood. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

FIGS. 7A and 7B are block diagrams illustrating example spectrum configurations.

FIG. 8 is a block diagram illustrating example blocks executed to implement one aspect of the present disclosure.

DETAILED DESCRIPTION

Figure 1:
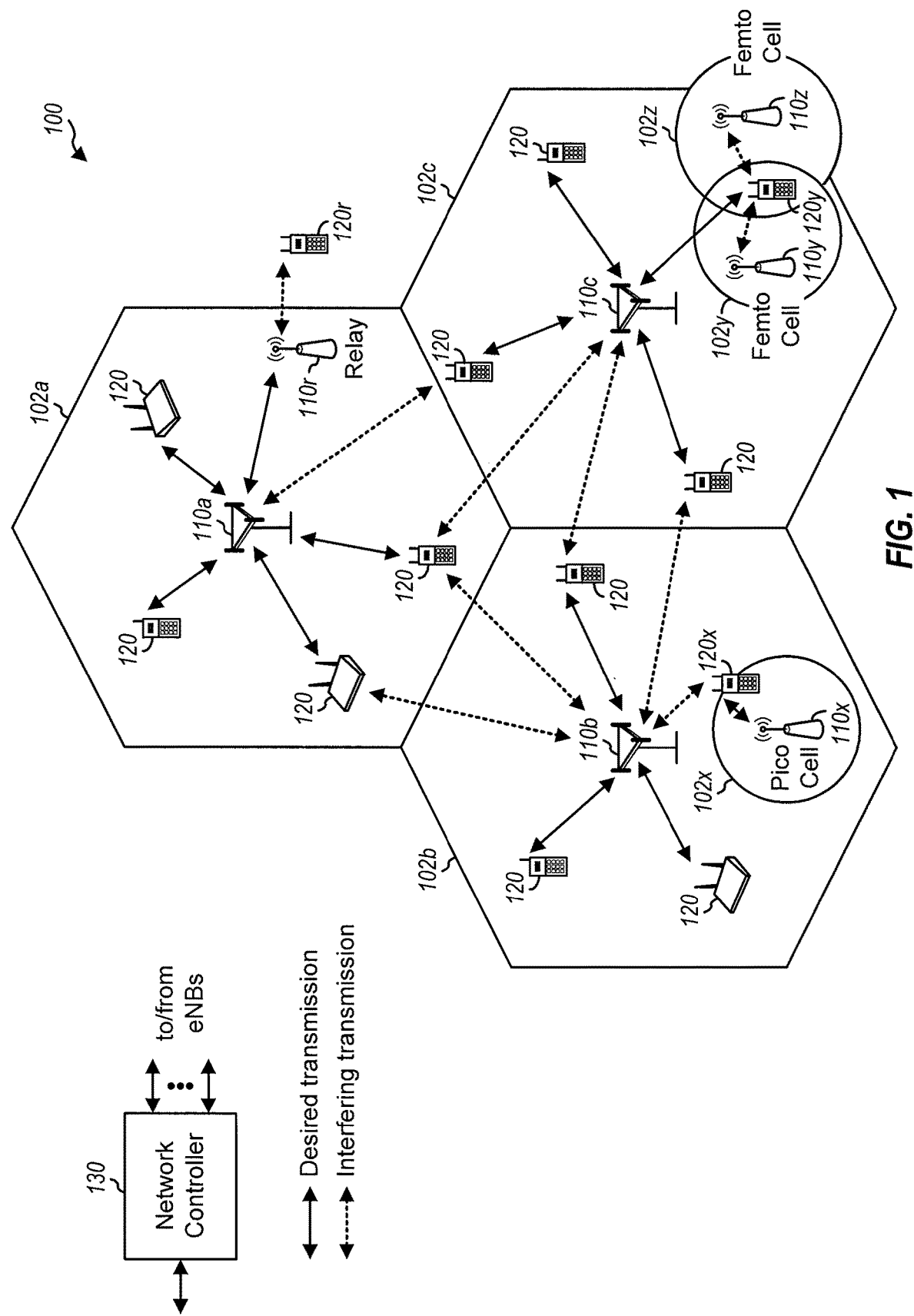
FIG. 1 is a block diagram illustrating an example of a telecommunications system in a telecommunications system.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is an upcoming release of UMTS that uses E-UTRA. UTRA, E-UTRA, GSM, UMTS and LTE are described in documents from an organization named "3rd Generation Partnership Project" (3GPP). CDMA2000 is described in documents from an organization named "3rd Generation Partnership Project 2" (3GPP2). These various radio technologies and standards are known in the art. For clarity, certain aspects of the techniques are described below for LTE, and LTE terminology is used in much of the description below.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

FIG. 1 shows a wireless communication network 100, which may be an LTE-A network. The wireless network 100 includes a number of evolved node Bs (eNodeBs) 110 and other network entities. An eNodeB may be a station that communicates with the UEs and may also be referred to as a base station, a node B, an access point, and the like. Each eNodeB 110 may provide communication coverage for a particular geographic area. In 3GPP, the term "cell" can refer to this particular geographic coverage area of an eNodeB and/or an eNodeB subsystem serving the coverage area, depending on the context in which the term is used.

An eNodeB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNodeB for a macro cell may be referred to as a macro eNodeB. An eNodeB for a pico cell may be referred to as a pico eNodeB. And, an eNodeB for a femto cell may be referred to as a femto eNodeB or a home eNodeB. In the example shown in FIG. 1, the eNodeBs 110a, 110b and 110c are macro eNodeBs for the macro cells 102a, 102b and 102c, respectively. The eNodeB 110x is a pico eNodeB for a pico cell 102x. And, the eNodeBs 110y and 110z are femto eNodeBs for the femto cells 102y and 102z, respectively. An eNodeB may support one or multiple (e.g., two, three, four, and the like) cells.

The wireless network 100 may also include relay stations. A relay station is a station that receives a transmission of data and/or other information from an upstream station (e.g., an eNodeB, UE, etc.) and sends a transmission of the data and/or other information to a downstream station (e.g., a UE or an eNodeB). A relay station may also be a UE that relays transmissions for other UEs. In the example shown in FIG. 1, a relay station 110r may communicate with the eNodeB 110a and a UE 120r in order to facilitate communication between the eNodeB 110a and the UE 120r. A relay station may also be referred to as a relay eNodeB, a relay, etc.

The wireless network 100 may be a heterogeneous network that includes eNodeBs of different types, e.g., macro eNodeBs, pico eNodeBs, femto eNodeBs, relays, etc. These different types of eNodeBs may have different transmit power levels, different coverage areas, and different impact on interference in the wireless network 100. For example, macro eNodeBs may have a high transmit power level (e.g., 20 Watts) whereas pico eNodeBs, femto eNodeBs and relays may have a lower transmit power level (e.g., 1 Watt).

The wireless network 100 may support synchronous or asynchronous operation. For synchronous operation, the eNodeBs may have similar frame timing, and transmissions from different eNodeBs may be approximately aligned in time. For asynchronous operation, the eNodeBs may have different frame timing, and transmissions from different eNodeBs may not be aligned in time. The techniques described herein may be used for either synchronous or asynchronous operations.

In one aspect, the wireless network 100 may support Frequency Division Duplex (FDD) or Time Division Duplex (TDD) modes of operation. The techniques described herein may be used for either FDD or TDD mode of operation.

A network controller 130 may couple to a set of eNodeBs 110 and provide coordination and control for these eNodeBs 110. The network controller 130 may communicate with the eNodeBs 110 via a backhaul. The eNodeBs 110 may also communicate with one another, e.g., directly or indirectly via a wireless backhaul or a wireline backhaul.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a laptop computer, a cordless phone, a wireless local loop (WLL) station, a tablet, or the like. A UE may be able to communicate with macro eNodeBs, pico eNodeBs, femto eNodeBs, relays, and the like. In FIG. 1, a solid line with double arrows indicates desired transmissions between a UE and a serving eNodeB, which is an eNodeB designated to serve the UE on the downlink and/or uplink. A dashed line with double arrows indicates interfering transmissions between a UE and an eNodeB.

LTE utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz (e.g., 6 resource blocks), and there may be 1, 2, 3, 8 or 16 sub-bands for a corresponding system bandwidth of 1.25, 2.5, 5, 10, 15 or 20 MHz, respectively.

Figure 2:
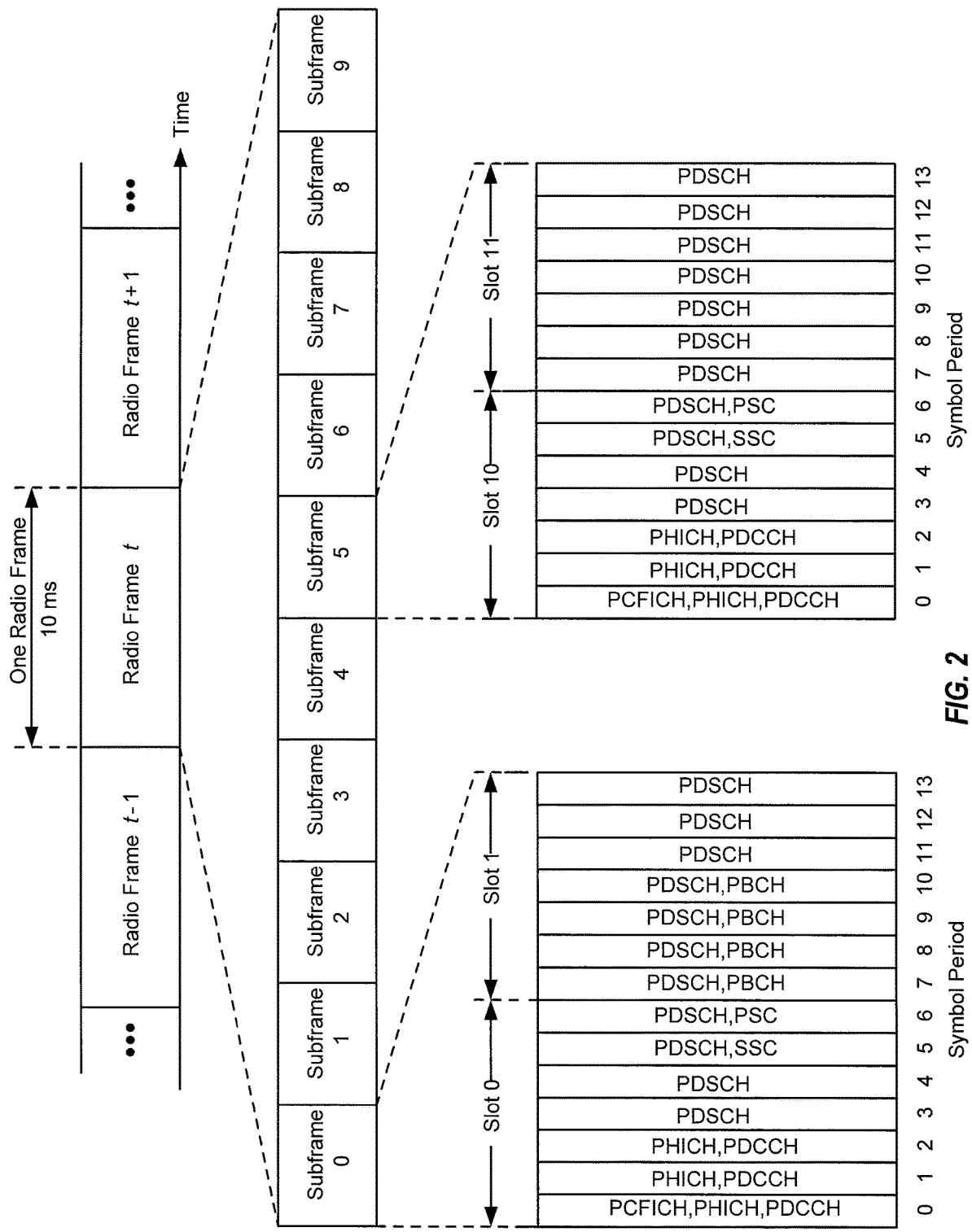
FIG. 2 is a diagram illustrating an example of a downlink frame structure in a telecommunications system.

FIG. 2 shows a downlink FDD frame structure used in LTE. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L−1. The available time frequency resources may be partitioned into resource blocks. Each resource block may cover N subcarriers (e.g., 12 subcarriers) in one slot.

In LTE, an eNodeB may send a primary synchronization signal (PSC or PSS) and a secondary synchronization signal (SSC or SSS) for each cell in the eNodeB. For FDD mode of operation, the primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. For FDD mode of operation, the eNodeB may send a Physical Broadcast Channel (PBCH) in symbol periods 0 to 3 in slot 1 of subframe 0. The PBCH may carry certain system information.

The eNodeB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 3 for a small system bandwidth, e.g., with less than 10 resource blocks. In the example shown in FIG. 2, M=3. The eNodeB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on uplink and downlink resource allocation for UEs and power control information for uplink channels. The eNodeB may send a Physical Downlink Shared Channel (PDSCH) in the remaining symbol periods of each subframe. The PDSCH may carry data for UEs scheduled for data transmission on the downlink.

The eNodeB may send the PSC, SSC and PBCH in the center 1.08 MHz of the system bandwidth used by the eNodeB. The eNodeB may send the PCFICH and PHICH across the entire system bandwidth in each symbol period in which these channels are sent. The eNodeB may send the PDCCH to groups of UEs in certain portions of the system bandwidth. The eNodeB may send the PDSCH to groups of UEs in specific portions of the system bandwidth. The eNodeB may send the PSC, SSC, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. For symbols that are used for control channels, the resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 36 or 72 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for all UEs in the PDCCH. An eNodeB may send the PDCCH to the UE in any of the combinations that the UE will search.

A UE may be within the coverage of multiple eNodeBs. One of these eNodeBs may be selected to serve the UE. The serving eNodeB may be selected based on various criteria such as received power, path loss, signal-to-noise ratio (SNR), etc.

Figure 3:
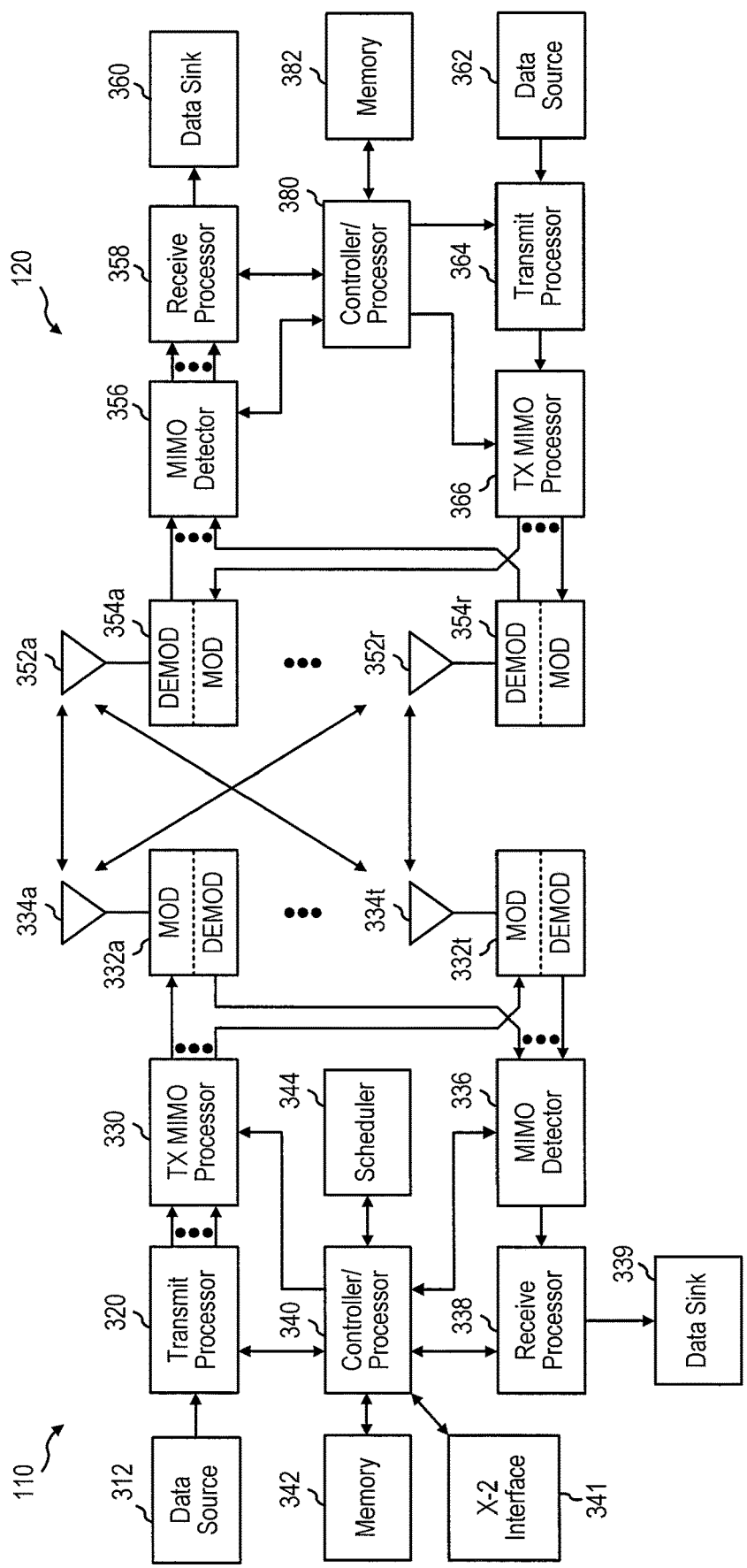
FIG. 3 is a block diagram illustrating a design of a base station/eNodeB and a UE configured according to one aspect of the present disclosure.

FIG. 3 shows a block diagram of a design of a base station/eNodeB 110 and a UE 120, which may be one of the base stations/eNodeBs and one of the UEs in FIG. 1. The base station 110 may be the macro eNodeB 110c in FIG. 1, and the UE 120 may be the UE 120y. The base station 110 may also be a base station of some other type. The base station 110 may be equipped with antennas 334a through 334t, and the UE 120 may be equipped with antennas 352a through 352r.

At the base station 110, a transmit processor 320 may receive data from a data source 312 and control information from a controller/processor 340. The control information may be for the PBCH, PCFICH, PHICH, PDCCH, etc. The data may be for the PDSCH, etc. The processor 320 may process (e.g., encode and symbol map) the data and control information to obtain data symbols and control symbols, respectively. The processor 320 may also generate reference symbols, e.g., for the PSS, SSS, and cell-specific reference signal. A transmit (TX) multiple-input multiple-output (MIMO) processor 330 may perform spatial processing (e.g., precoding) on the data symbols, the control symbols, and/or the reference symbols, if applicable, and may provide output symbol streams to the modulators (MODs) 332a through 332t. Each modulator 332 may process a respective output symbol stream (e.g., for OFDM, etc.) to obtain an output sample stream. Each modulator 332 may further process (e.g., convert to analog, amplify, filter, and upconvert) the output sample stream to obtain a downlink signal. Downlink signals from modulators 332a through 332t may be transmitted via the antennas 334a through 334t, respectively.

At the UE 120, the antennas 352a through 352r may receive the downlink signals from the base station 110 and may provide received signals to the demodulators (DEMODs) 354a through 354r, respectively. Each demodulator 354 may condition (e.g., filter, amplify, downconvert, and digitize) a respective received signal to obtain input samples. Each demodulator 354 may further process the input samples (e.g., for OFDM, etc.) to obtain received symbols. A MIMO detector 356 may obtain received symbols from all the demodulators 354a through 354r, perform MIMO detection on the received symbols if applicable, and provide detected symbols. A receive processor 358 may process (e.g., demodulate, deinterleave, and decode) the detected symbols, provide decoded data for the UE 120 to a data sink 360, and provide decoded control information to a controller/processor 380.

On the uplink, at the UE 120, a transmit processor 364 may receive and process data (e.g., for the PUSCH) from a data source 362 and control information (e.g., for the PUCCH) from the controller/processor 380. The processor 364 may also generate reference symbols for a reference signal. The symbols from the transmit processor 364 may be precoded by a TX MIMO processor 366 if applicable, further processed by the modulators 354a through 354r (e.g., for SC-FDM, etc.), and transmitted to the base station 110. At the base station 110, the uplink signals from the UE 120 may be received by the antennas 334, processed by the demodulators 332, detected by a MIMO detector 336 if applicable, and further processed by a receive processor 338 to obtain decoded data and control information sent by the UE 120. The processor 338 may provide the decoded data to a data sink 339 and the decoded control information to the controller/processor 340. The base station 110 can send messages to other base stations, for example, over an X2 interface 341.

The controllers/processors 340 and 380 may direct the operation at the base station 110 and the UE 120, respectively. The processor 340 and/or other processors and modules at the base station 110 may perform or direct the execution of various processes for the techniques described herein. The processor 380 and/or other processors and modules at the UE 120 may also perform or direct the execution of the functional blocks illustrated in use FIG. 7, and/or other processes for the techniques described herein. The memories 342 and 382 may store data and program codes for the base station 110 and the UE 120, respectively. A scheduler 344 may schedule UEs for data transmission on the downlink and/or uplink.

LTE-A UEs use spectrum in up to 20 Mhz bandwidths allocated in a carrier aggregation of up to a total of 100 Mhz (5 component carriers) used for transmission in each direction. Generally, less traffic is transmitted on the uplink than the downlink, so the uplink spectrum allocation may be smaller than the downlink allocation. For example, if 20 Mhz is assigned to the uplink, the downlink may be assigned 100 Mhz. These asymmetric FDD assignments will conserve spectrum and are a good fit for the typically asymmetric bandwidth utilization by broadband subscribers.

Figure 4A:
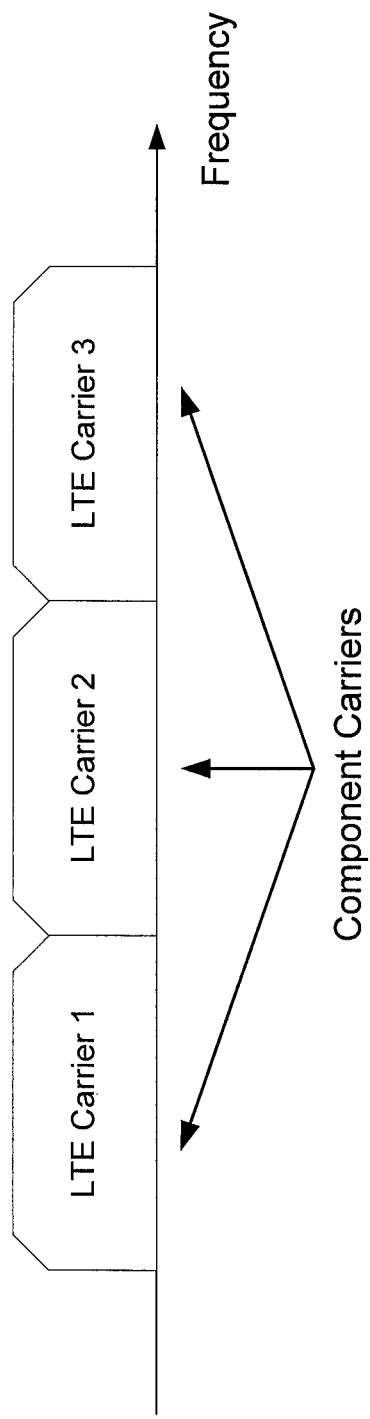
FIG. 4A discloses a continuous carrier aggregation type.
Figure 4B:
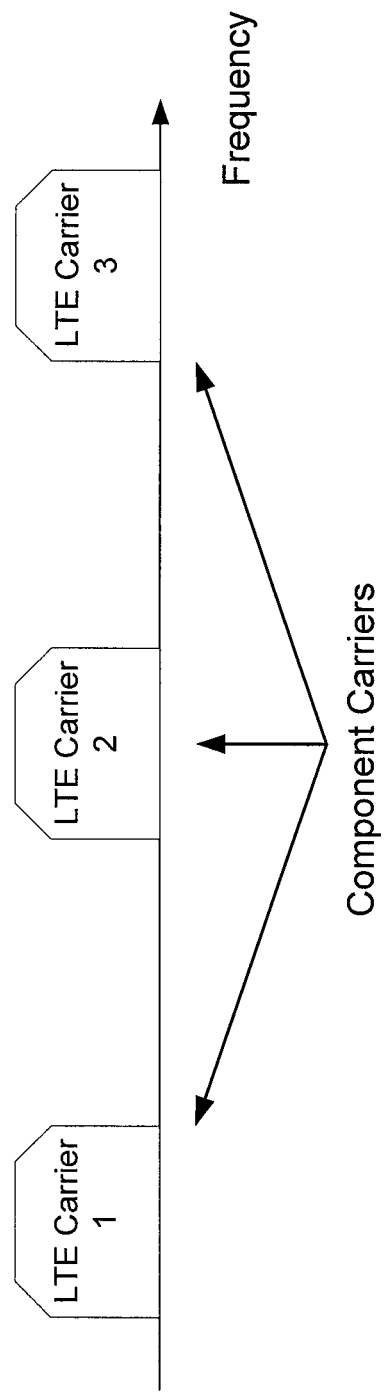
FIG. 4B discloses a non-continuous carrier aggregation type.

For the LTE-A mobile systems, two types of carrier aggregation (CA) methods have been proposed, continuous CA and non-continuous CA. They are illustrated in FIGS. 4A and 4B. Non-continuous CA occurs when multiple available component carriers are separated along the frequency band (FIG. 4B). On the other hand, continuous CA occurs when multiple available component carriers are adjacent to each other (FIG. 4A). Both non-continuous and continuous CA aggregate multiple LTE/component carriers to serve a single unit of LTE Advanced UE.

Multiple RF receiving units and multiple FFTs may be deployed with non-continuous CA in LTE-Advanced UE since the carriers are separated along the frequency band. Because non-continuous CA supports data transmissions over multiple separated carriers across a large frequency range, propagation path loss, Doppler shift and other radio channel characteristics may vary a lot at different frequency bands.

Thus, to support broadband data transmission under the non-continuous CA approach, methods may be used to adaptively adjust coding, modulation and transmission power for different component carriers. For example, in an LTE-Advanced system where the enhanced NodeB (eNodeB) has fixed transmitting power on each component carrier, the effective coverage or supportable modulation and coding of each component carrier may be different.

Figure 5:
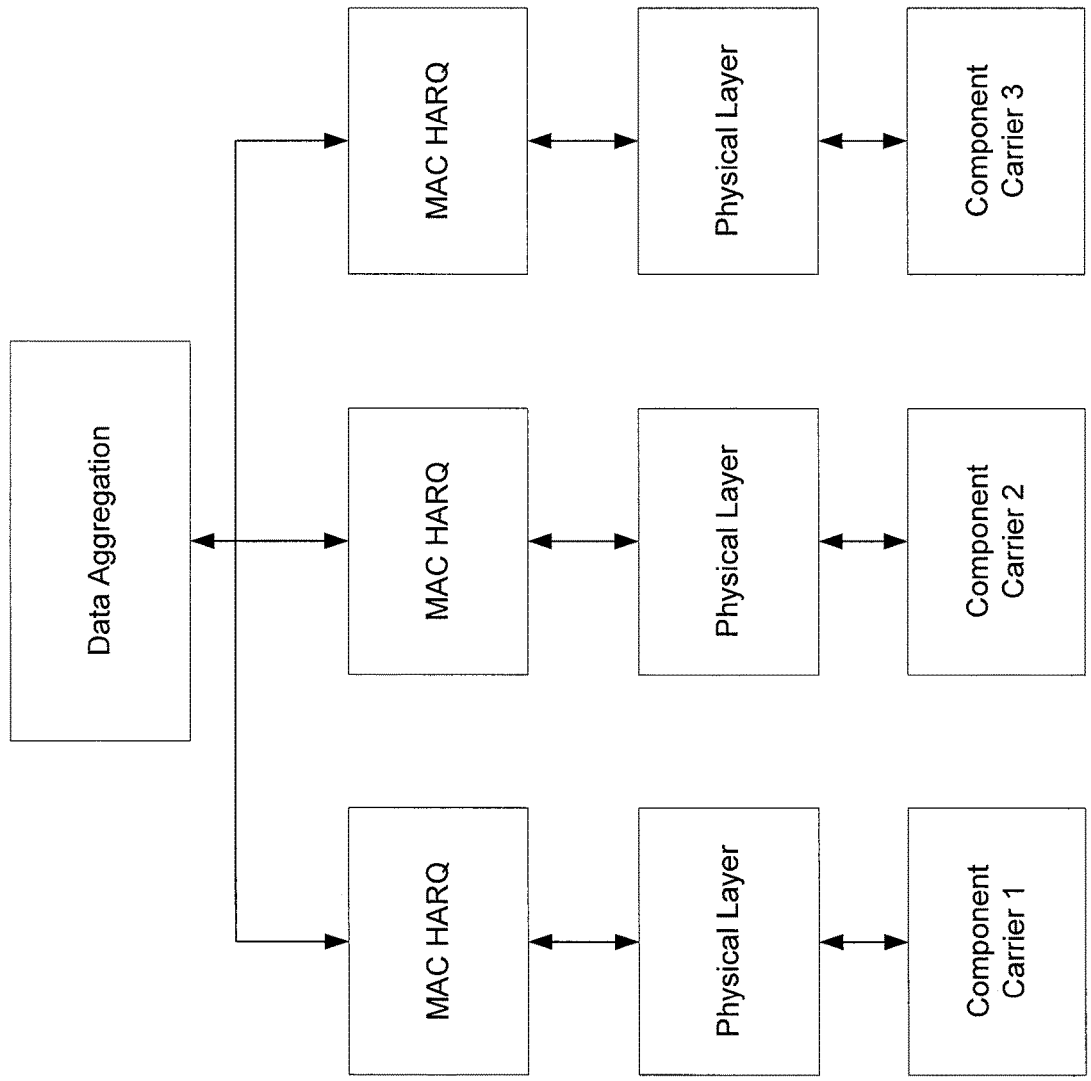
FIG. 5 discloses MAC layer data aggregation.

FIG. 5 illustrates aggregating transmission blocks (TBs) from different component carriers at the medium access control (MAC) layer (FIG. 5) for an IMT-Advanced system. With MAC layer data aggregation, each component carrier has its own independent hybrid automatic repeat request (HARQ) entity in the MAC layer and its own transmission configuration parameters (e.g., transmitting power, modulation and coding schemes, and multiple antenna configuration) in the physical layer. Similarly, in the physical layer, one HARQ entity is provided for each component carrier.

In general, there are three different approaches for deploying control channel signaling for multiple component carriers. The first involves a minor modification of the control structure in LTE systems where each component carrier is given its own coded control channel.

The second method involves jointly coding the control channels of different component carriers and deploying the control channels in a dedicated component carrier. The control information for the multiple component carriers will be integrated as the signaling content in this dedicated control channel. As a result, backward compatibility with the control channel structure in LTE systems is maintained, while signaling overhead in the CA is reduced.

Multiple control channels for different component carriers are jointly coded and then transmitted over the entire frequency band formed by a third CA method. This approach offers low signaling overhead and high decoding performance in control channels, at the expense of high power consumption at the UE side. However, this method is not compatible with LTE systems.

Further enhancements to the LTE carrier aggregation have been suggested to provide support for a UE aggregating multiple time division (TD)-LTE serving cells in a single band with different uplink-downlink configurations. In other words, different time division duplex (TDD) uplink-downlink configurations may be adopted for a macro and small cell adjacent-channel deployment in order to address downlink heavy traffic. In order to ensure co-existence, the downlink subframes from macro cells should not collide with the uplink subframes from adjacent small cells. However, due to the lower transmission power of small cells, the downlink subframes from small cells may collide with the macro cell uplink subframes without resulting in a degradation of performance. Under current guidelines, a UE is allowed to aggregate TDD serving cells with different TDD uplink-downlink configurations when in different bands, but only allowed to aggregate TDD serving cells in a single band when the uplink-downlink configurations are the same for each of the serving cells.

For a UE to aggregate TD-LTE serving cells in a single band or the same band, half duplex operation may be assumed for the UE, in order to avoid the UE causing uplink-to-downlink interference with itself. However, current specifications may not allow for a half duplex UE to receive PDSCH in each downlink subframes of all of the aggregated serving cells if the uplink-downlink configuration of the primary serving cell (PCell) has fewer downlink subframes than the secondary serving cell(s) (SCell(s)). SCells may be configured using small cells with lower power than a macro cell. In some aspects, a PCell may also be configured using a small cell; however, PCells are more commonly configured using a macro cell. Various aspects of the present disclosure provide a new mechanism to support half duplex UEs receiving PDSCH in the downlink subframes of all of the aggregated serving cells in the same band when a PCell has fewer downlink subframes than SCells deployed in a single band with different uplink-downlink configurations from the PCell. In a first such aspect of the present disclosure, the UE can accommodate the different uplink-downlink configurations by determining the subframe direction in that PCell-SCell transmissions.

Figure 6:
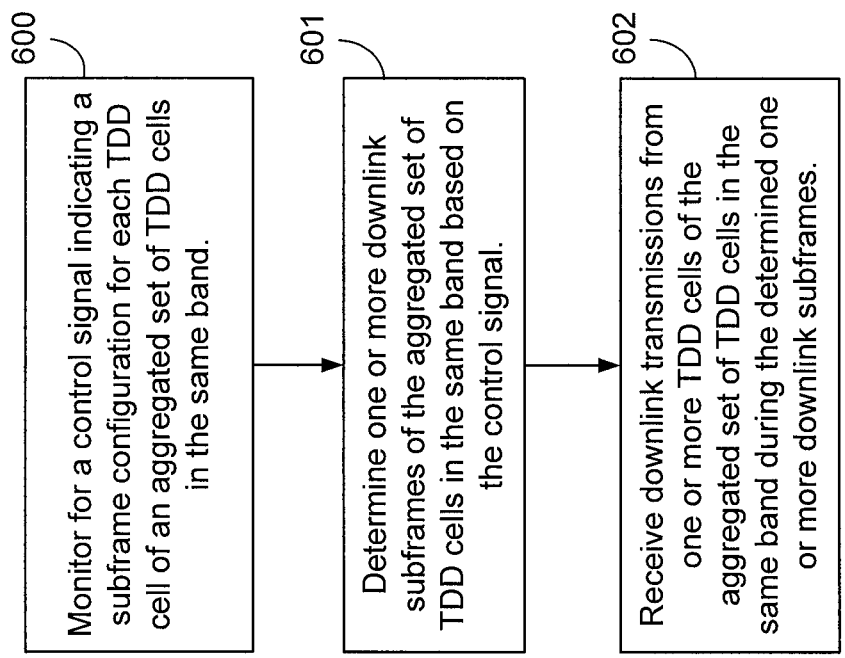
FIG. 6 is a block diagram illustrating example blocks executed to implement one aspect of the present disclosure.

FIG. 6 is a block diagram illustrating example blocks executed to implement one aspect of the present disclosure. At block 600, a half duplex UE monitors for a control signal indicating a subframe configuration for each TDD cell of an aggregated set of TDD cells in the same or a single band. For example, a UE may monitor for an uplink grant on the PCell or dynamic signaling (e.g., layer 1 signaling, uplink/downlink reconfiguration signaling in enhanced interference management & traffic adaptation (eIMTA), and the like).

At block 601, the UE determines one or more downlink subframes for the aggregated set of TDD cells in the same band based on the control signal. For example, in one aspect, when an uplink grant is not detected, the UE may determine that the next SCell subframes are downlink subframes. In another aspect, a reference subframe configuration may be signaled via L1 signaling in which the reference subframe configuration provides a relationship to the uplink-downlink configurations of the PCell and SCells. In such aspects, the signaled reference subframe configuration may be determined based on the broadcast uplink-downlink configurations of the aggregated cells. In one such aspect, the downlink subframes of the reference subframe configuration may be a subset of the downlink subframes of the broadcast configuration of the SCells and a superset of the downlink subframes of the broadcast configuration of the PCells. Similarly, the uplink subframes of the reference subframe configuration may be a subset of the uplink subframes of the broadcast configuration of the PCell and a superset of the uplink subframes of the broadcast configuration of the SCells. In another aspect, the control signal may be an uplink/downlink reconfiguration signaling in eIMTA dynamically changing the subframe configuration of the SCells. Thus, the UE monitors the subframes of the PCell based on the broadcast subframe configuration and monitors the subframes of the SCell based on the eIMTA reconfiguration for the SCells.

At block 602, the UE receives downlink transmissions from one or more of the TDD cells of the aggregated set in the same band during the determined downlink subframes. Thus, the UE may receive downlink transmissions on the downlink subframes as determined by such control signals.

The proposed enhancement of the various aspects of the present disclosure may be applied to the PCell/SCell deployment with different uplink-downlink configurations either on different bands or in same band for half-duplex UE operation. As implemented in various configurations, a macro cell may be configured as the PCell with fewer downlink subframes and a small cell may be configured as the SCell(s) with a superset of downlink subframes. Ideal backhaul may also assumed in various aspects for the PCell-SCell deployment.

FIGS. 7A and 7B are block diagrams illustrating spectrum configurations 70 and 71. In spectrum configuration 70, a first operator operates a frequency division duplex (FDD) spectrum 701. A second operator in spectrum configuration 70 operates a second spectrum 702, that includes a TDD spectrum 703 and a guard band 704 in the same band adjacent to first spectrum 701. In spectrum configuration 71, a first operator operates a spectrum 705, which includes a TDD spectrum 707 and guard band 708. A second operator in spectrum configuration 71 operates TDD spectrum 706. In spectrum configurations 70 and 71, guard bands 704, 708, FDD spectrum 703, and TDD spectrum 702, 706, and 707 can be used for macro-macro, macro-small cell, and small cell-small cell deployment. For guard bands 704 and 708, which belongs to the TDD operators of second spectrum 702 and spectrum 705, guard bands 704 and 708 can be configured to accommodate an SCell and be aggregated with TDD spectrum 703 and 707 by utilizing intra-band carrier aggregation to improve the spectrum efficiency, especially for downlink-heavy traffic scenarios.

For intra-band carrier aggregation. in which the SCells operate with the same TDD uplink-downlink configuration as PCell, the PCell is configured at TDD spectrum 707, while guard band 708 operates with the SCell. Under current guidelines, the same TDD uplink-downlink configuration is deployed for the SCell in guard band 708 and the PCell in TDD spectrum 707. Because the set of aggregated TDD cells operates using the same TDD uplink-downlink configuration, the hybrid automatic repeat request (HARQ) timeline for the SCells in guard band 708 may follow the PCell HARQ timeline. For TDD carrier aggregation, a TDD base station will not schedule an uplink grant for a UE to transmit uplink on guard band 704, so as to reduce or avoid the interference to the adjacent FDD spectrum 703 and communications between an FDD UE from an FDD base station.

Referring back to FIG. 6, in a first aspect of the present disclosure, a UE may determine the direction of a subframe in a carrier aggregation scenario in which the PCell and SCell have different uplink-downlink configurations. The determination may be made through monitoring for control signals, either the presence or lack of presence of such signals. In a first example control signal, the presence or absence of uplink grants on the PCell is used.

Figure 9:
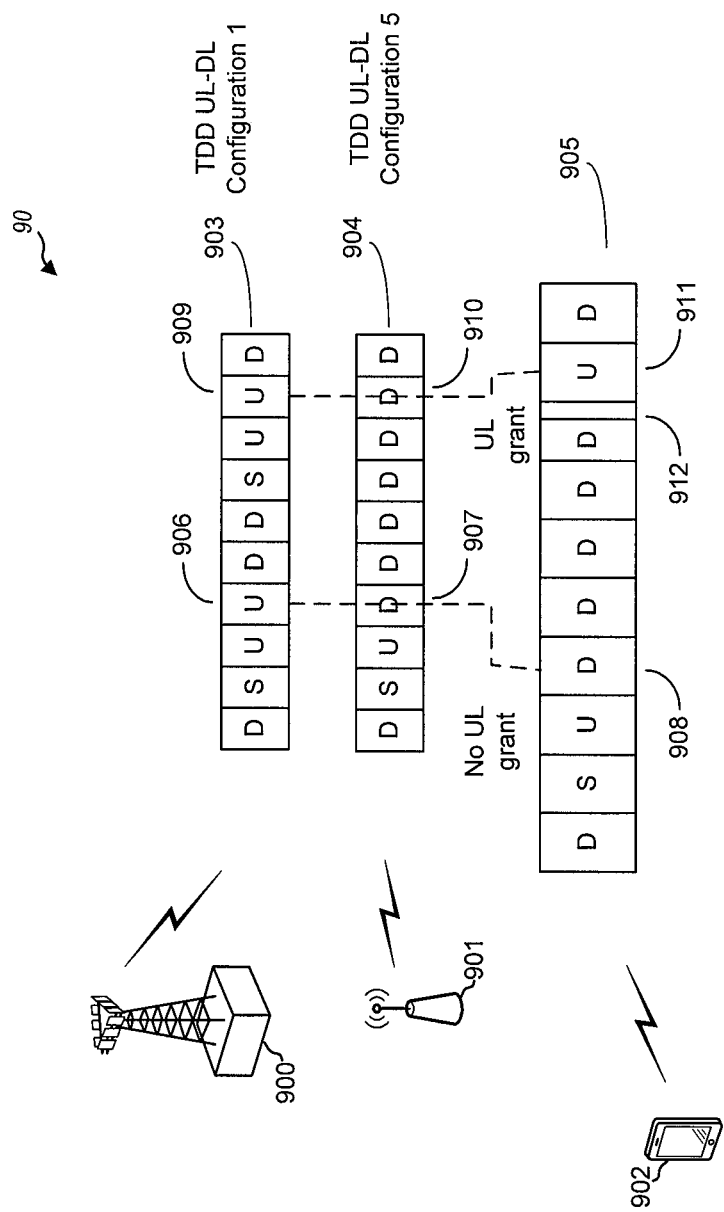
FIG. 9 is a block diagram illustrating a UE configured as a half duplex UE according to one aspect of the present disclosure.

FIG. 8 is a block diagram illustrating example blocks executed to implement one aspect of the present disclosure. The processes and actions described with respect to the example blocks illustrated in FIG. 8 will also be described with respect to the components and actions illustrated in FIG. 9. FIG. 9 is a block diagram illustrating a UE 902 configured as a half duplex UE according to one aspect of the present disclosure. UE 902 may include similar features and components to UE 120 (FIG. 3). At block 800, a UE, such as UE 902, monitors for one or more uplink grants from a primary TDD cell of an aggregated set of TDD cells in the same band. Macro base station 900 is configured as the PCell of the aggregated set of TDD cells including macro base station 900 and small cell base station 901, which is configured as the SCell. Macro base station 900 operates according to uplink-downlink configuration 1, as illustrated in transmission frame 903. Small cell base station 901 operates according to uplink-downlink configuration 5, as illustrated in transmission frame 904. UE 902 operates by determining the direction of subframes as illustrated in UE transmission frame 905.

At block 801, the UE, such as UE 902, determines one or more downlink subframes of the secondary TDD cells, such as small cell base station 901, when no uplink grants are received. For example, the PCell of macro base station 900 sends an uplink grant for subframe 909, but does not send an uplink grant for subframe 906. UE 902 detects that no uplink grant is received for subframe 908 and, thus, determines that subframe 908 is a downlink subframe. UE 902 also detects the uplink grant for subframe 909 and determines that subframe 911 is an uplink subframe.

At block 802, the UE, such as UE 902, receives downlink transmissions from one or more TDD cells in the same band of the aggregated set during the determined downlink subframes. For example, while subframe 906 of the PCell of macro base station 900 is configured as an uplink subframe, the corresponding subframe 907 of the SCell of small cell base station 901 is configured as a downlink subframe. As such, UE 902, at corresponding subframe 908, may receive downlink transmissions (e.g., begin decoding PDSCH/PDCCH) from small cell base station 901 and, perhaps, perform cell measurements on the downlink transmissions. Small cell base station 901 may be able to transmit downlink signals in the configured downlink subframe 907 to UE 902 with no uplink transmission in the corresponding uplink subframe 906 of macro cell base station 900.

Because UE 902 received an uplink grant for subframe 911, it may transmit uplink signals to macro base station 900. It should be noted that, because the subframe immediately preceding subframe 911 is detected as a downlink subframe, UE 902 may discard a predetermined number, K, of symbols at the end 912 of the preceding subframe. This gap or guard period will allow UE 902 to transition from downlink to uplink. Alternatively, if the preceding subframe is configured as a downlink subframe, the uplink transmission in subframe 911 may be dropped.

In another aspect of the present disclosure in which the UE determines a direction of the subframe, the determination of the subframe may be based on dynamic L1 signaling. A reference configuration, for example, may be indicated by such L1 signaling and used to determine which downlink subframes of the SCells are used for downlink and which uplink subframes in the PCell are used for uplink.

Figure 10:
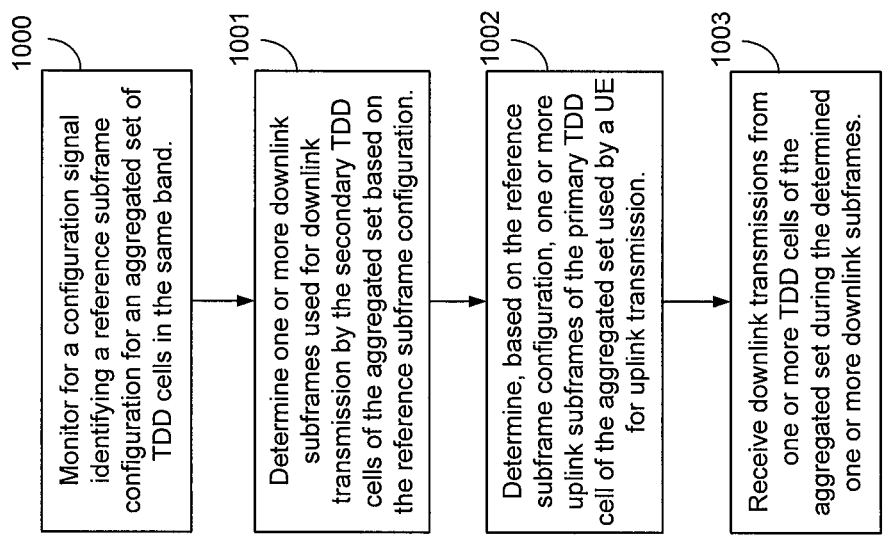
FIG. 10 is a block diagram illustrating example blocks executed to implement one aspect of the present disclosure.
Figure 11:
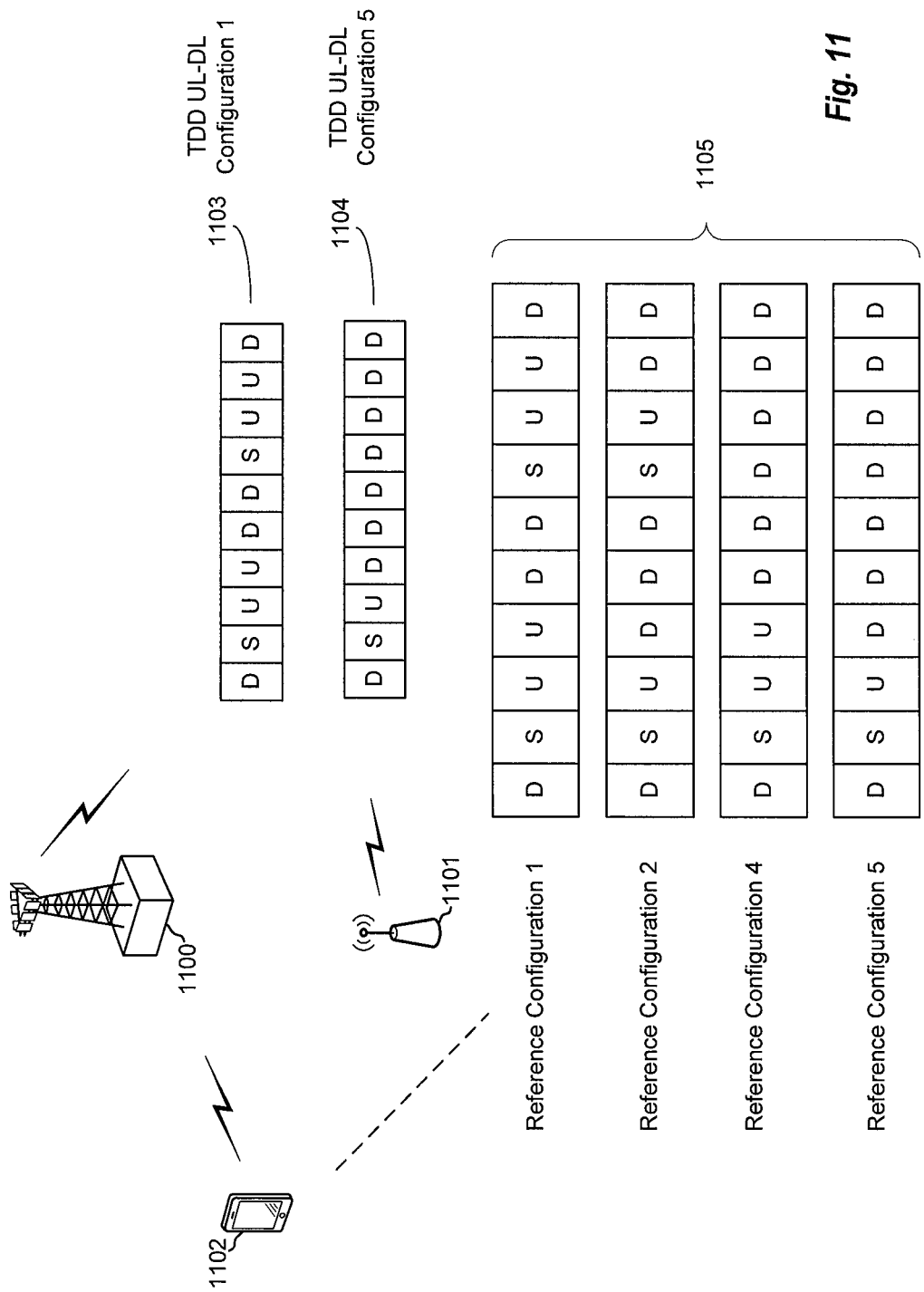
FIG. 11 is a block diagram illustrating a UE configured as a half duplex UE according to one aspect of the present disclosure.

FIG. 10 is a block diagram illustrating example blocks executed to implement one aspect of the present disclosure. The processes and actions described with respect to the example blocks illustrated in FIG. 10 will also be described with respect to the components and actions illustrated in FIG. 11. FIG. 11 is a block diagram illustrating a UE 1102 configured as a half duplex UE according to one aspect of the present disclosure. UE 1102 may include similar features and components to UEs 902 and 120 (FIG. 3). At block 1000, a UE, such as UE 1102 monitors for a configuration signal identifying a reference subframe configuration for an aggregated set of TDD cells in the same band. Configuration signals, which may include L1 signaling from macro base station 1100, may identify one of several reference subframe configurations 1105 related to the uplink-downlink configurations of base station 1100 and small cell base station 1101. Base station 1100 operates as the PCell of the aggregated set of TDD cells including macro base station 1100 and small cell base station 1101, which is configured as the SCell. Macro base station 1100 operates according to uplink-downlink configuration 1, as illustrated in transmission frame 1103. Small cell base station 1101 operates according to uplink-downlink configuration 5, as illustrated in transmission frame 1104.

At block 1001, the UE determines one or more downlink subframes used for downlink transmission by the secondary TDD cells of the aggregated set based on the reference subframe configuration. The signaling received at UE 1102 from macro base station 1100 will identify one of reference subframe configurations 1105, as the reference subframe for UE 1102 to operate with. The particular reference configuration is determined by the broadcast uplink-downlink configuration of both macro base station 1100 and small cell base station 1101 (e.g., the configuration may be broadcast using system information block (SIB) messages, such as SIB1). The downlink subframes of the reference subframe configuration is a subset of the downlink subframes of the broadcast configurations of the SCells (small cell base station 1101) and a superset of the downlink subframes of the PCell (macro cell base station 1100). Conversely, the uplink subframes of the reference subframe configuration is a subset of the uplink subframes of the broadcast configurations of the PCell (macro cell base station 1100) and a superset of the uplink subframes of the SCells (small cell base station 1101). The four alternative configurations illustrated as reference subframe configuration 1005 each comply with the subset/super set guidelines above.

It should be noted that the L1 signaling can be UE-specific or UE group common so that the UEs served by the aggregated set of TDD cells in the same band can be configured with different reference configurations.

In another aspect of the present disclosure in which the UE determines a direction of the subframe, the determination of the subframe may be based on dynamic uplink/downlink reconfiguration signaling in eIMTA. It may also be possible to provide the same uplink-downlink configuration for both PCell and SCells, and apply dynamic eIMTA reconfiguration only to the small cell. For example, the dynamic uplink-downlink configuration indicated by the eIMTA reconfiguration in the downlink control indicator (DCI) may be used to inform the UE of the downlink subframes in the SCells of the aggregated set of TDD cells in order to detect (e)PDCCH/(e)PDSCH, and to possibly measure channel quality statistics (e.g., channel state information (CSI)).

Figure 12:
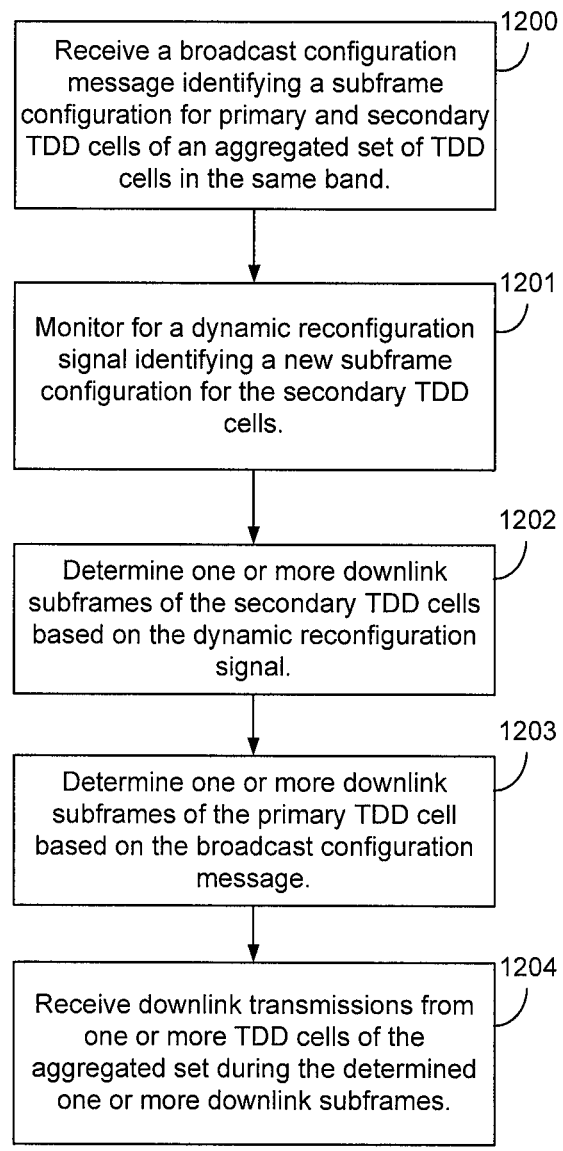
FIG. 12 is a block diagram illustrating example blocks executed to implement one aspect of the present disclosure.
Figure 13:
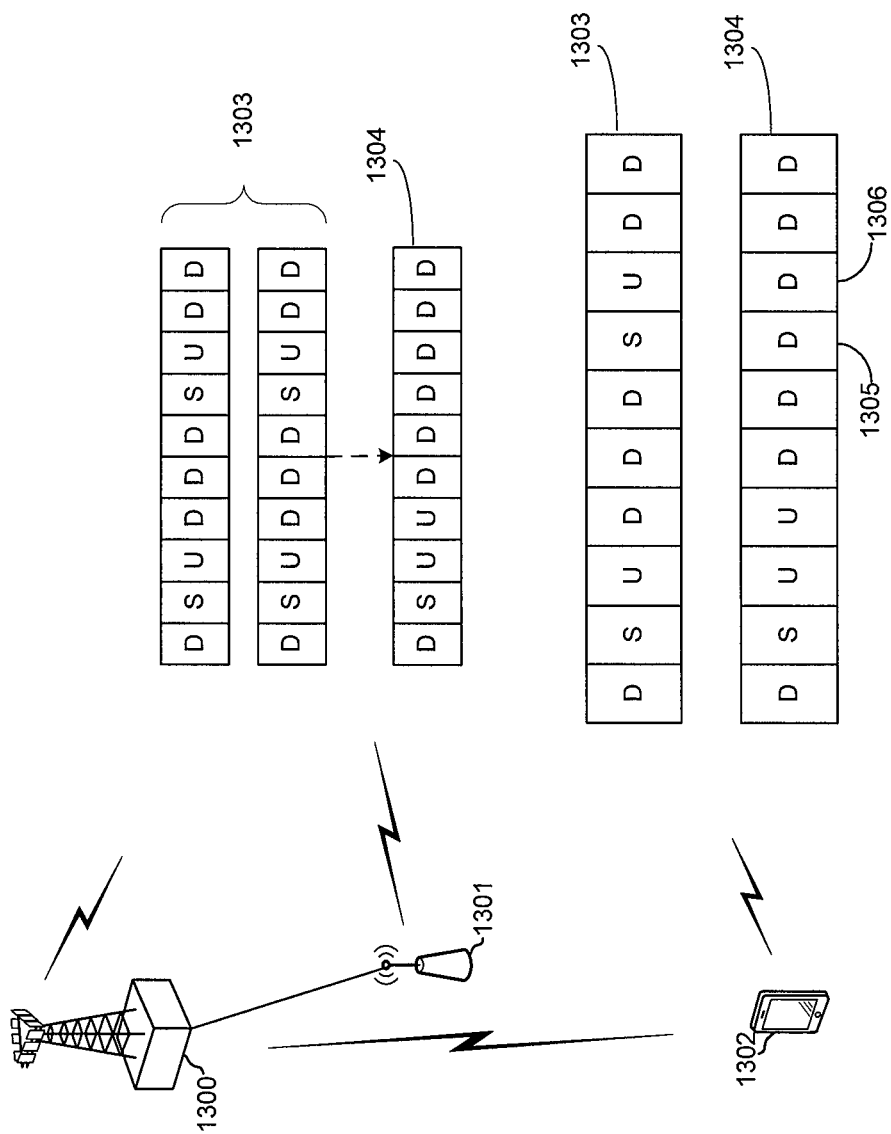
FIG. 13 is a block diagram illustrating a UE configured as a half duplex UE according to one aspect of the present disclosure.

FIG. 12 is a block diagram illustrating example blocks executed to implement one aspect of the present disclosure. The processes and actions described with respect to the example blocks illustrated in FIG. 12 will also be described with respect to the components and actions illustrated in FIG. 13. FIG. 13 is a block diagram illustrating a UE 1302 configured as a half duplex UE according to one aspect of the present disclosure. UE 1302 may include similar features and components to UEs 1102, 902, and 120 (FIG. 3). At block 1200, a UE, such as UE 1302, receives a broadcast configuration message identifying a subframe configuration for the primary and secondary TDD cells of an aggregated set of TDD cells in the same band. For example, UE 1302 may receive the SIB1 message broadcast by macro base station 1300, configured as the PCell, which identifies the uplink-downlink configuration of broadcast configuration 1303 of both macro base station 1300 and small cell base station 1301, configured as the SCell. Broadcast configurations 1303 are the same configuration for both PCell and SCell (macro base station 1300 and small cell base station 1301).

At block 1201, the UE monitors for a dynamic reconfiguration signal identifying a new subframe configuration for the secondary TDD cells. For example, UE 1302 monitors for a dynamic reconfiguration signal, such as an uplink/downlink reconfiguration signal in eIMTA in a DCI from one of macro base station 1300, which dynamically reconfigures the TDD uplink-downlink configuration of the SCell (small cell base station 1301). Such a dynamic uplink/downlink reconfiguration signal may reconfigure the SCell to dynamic configuration 1304.

At block 1202, the UE determines one or more secondary cell downlink subframes of the secondary cells based on the dynamic reconfiguration signal and, at block 1203, determines one or more primary downlink subframes of the primary cell based on the broadcast configuration message. Thus, after receiving a DCI message that includes a dynamic reconfiguration of small cell base station 1301, UE 1302 will determine PCell downlink subframes according to broadcast configuration 1303 and SCell downlink subframes according to dynamic configuration 1304.

At block 1204, the UE will receive downlink transmissions from one or more TDD cells of the aggregated set in the same band during the determined downlink subframes. For example, UE 1302 may receive downlink transmissions from macro base station 1300 in the downlink subframes identified in broadcast configuration 1303 and from small cell base station 1301 in the downlink subframes identified in dynamic configuration 1304.

It should be noted that the dynamic reconfiguration signaling may be a UE group common transmission. Thus, UEs can be configured with different dynamic uplink-downlink configurations. In operation, the SCells (e.g., small cell base station 1301) may have downlink subframes that were dynamically reconfigured that would experience interference from uplink transmissions of the PCell (e.g., macro cell base station 1300). For example, subframes 1305 and 1306 are both configured as downlink subframes for the SCell in dynamic configuration 1304, while they are configured as an S cell and uplink cell in broadcast configuration 1303. Thus, the uplink portion of the S subframe and the uplink subframe of broadcast configuration 1303 may experience downlink interference from the downlink subframes of dynamic configuration 1304. Because of the lower power of small cell base station 1301 in downlink, the downlink transmissions at subframes 1305 and 1306 may not cause severe interference to the uplink of broadcast configuration 1303.

In additional aspects, when interference results between the downlink subframes of dynamic configuration 1304 and broadcast configuration 1303, a subframe set-dependent CSI measurement may be configured for the UE with regard to small cell base station 1301. Therefore, when configured with the subframe set-dependent CSI measurement, the UE, such as UE 1302 may adjust CSI measurement with respect to small cell base station 1301 for the potential downlink-uplink interference with macro base station 1300.

It should further be noted that, generally, a macro PCell, such as macro base station 1300, cannot be configured with TDD eIMTA to adapt uplink-downlink configuration based on traffic load. However, if the PCell is configured to be another small cell, it may be possible to use TDD eIMTA in the PCell, as well. In such case, the example aspects that use monitoring of uplink grants and that receive a reference subframe configuration via control signaling may still be used to inform the UE of the downlink subframes in the small cells of both PCell and SCell to detect (e)PDCCH/(e)PDSCH, and to possibly measure CSI. The aspects that use dynamic uplink/downlink reconfiguration signaling in eIMTA may not be used as eIMTA is not assumed in PCell.

Additional aspects of the present disclosure may provide for determination of downlink error-control messaging timing, such as HARQ timing for aggregated TDD cells in which the PCell has a different uplink-downlink configuration than the SCells. In general, intra-band carrier aggregation with different uplink-downlink configurations can be classified into two categories. In a first category, the SCell has more downlink subframes than the PCell, or, more exactly speaking, the SCell downlink subframes are a superset of the PCell downlink subframes. In the second category, the SCell has more uplink subframes than the PCell, or, more exactly speaking, the SCell uplink subframes are a superset of the PCell uplink subframes.

Figure 14:
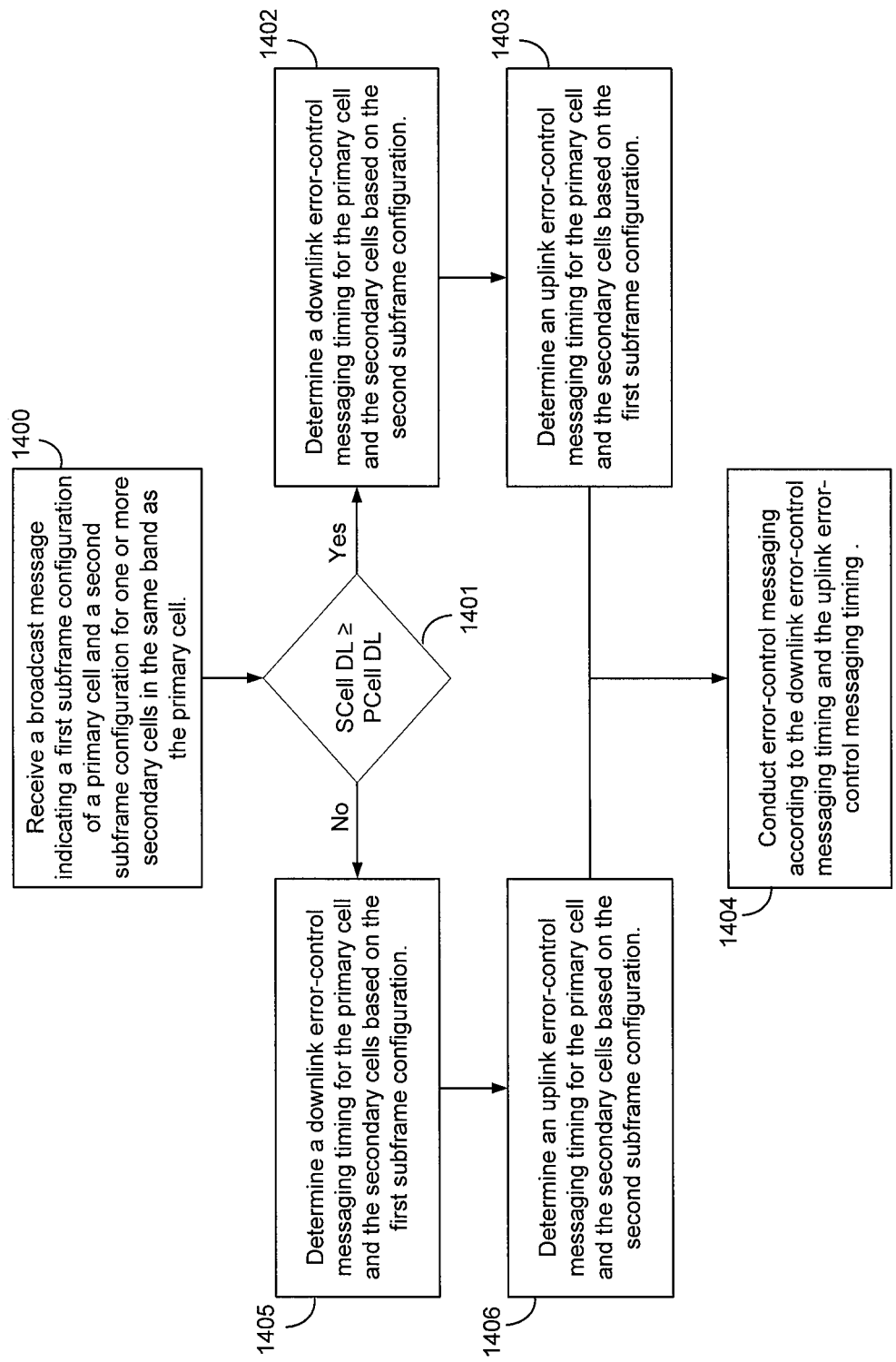
FIG. 14 is a block diagram illustrating example blocks executed to implement one aspect of the present disclosure.

FIG. 14 is a block diagram illustrating example blocks executed to implement one aspect of the present disclosure.

Figure 15A:
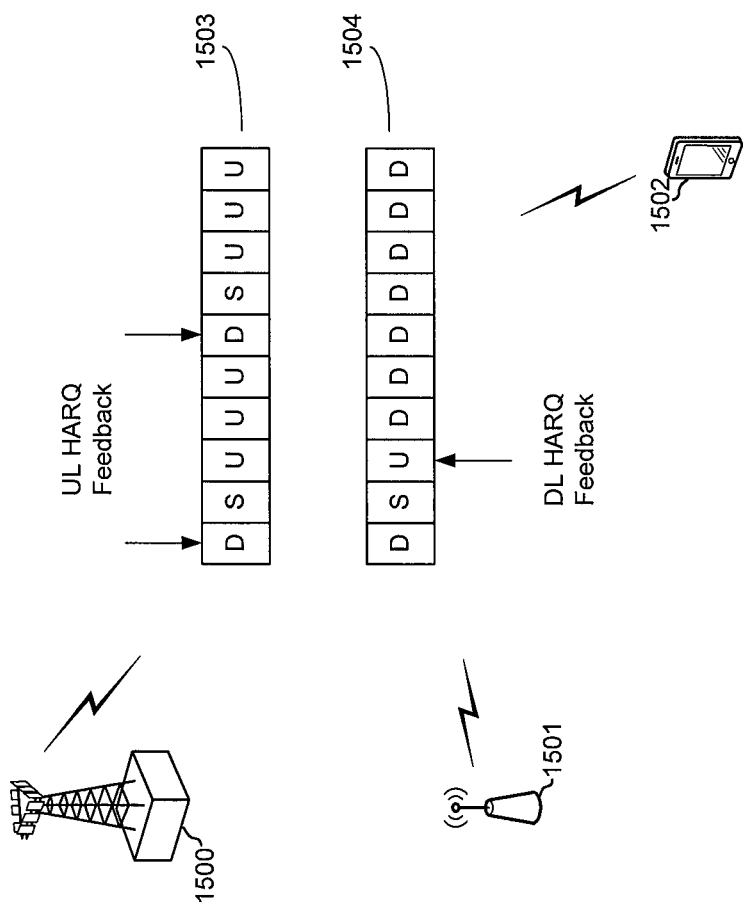
FIGS. 15A and 15B are block diagrams illustrating a UE configured as a half duplex UE according to aspects of the present disclosure.
Figure 15B:
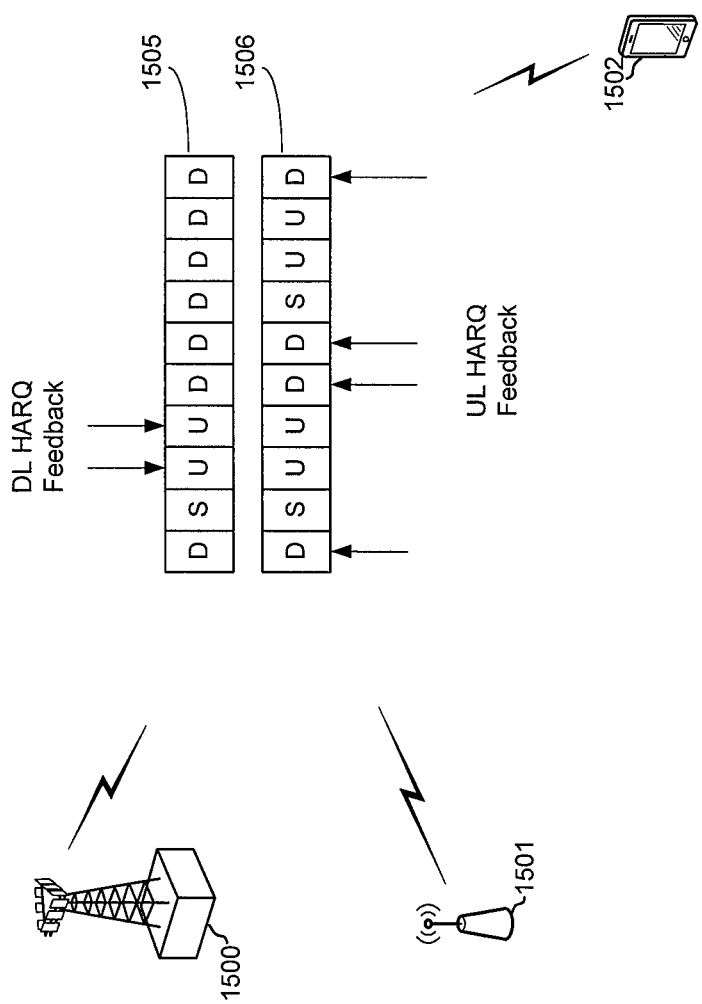

The processes and actions described with respect to the example blocks illustrated in FIG. 14 will also be described with respect to the components and actions illustrated in FIGS. 15A and 15B. FIGS. 15A and 15B are block diagrams illustrating a UE 1502 configured as a half duplex UE according to aspects of the present disclosure. UE 1502 may include similar features and components to UEs 1302, 1102, 902, and 120 (FIG. 3). At block 1400, a UE receives a broadcast message indicating a first subframe configuration of a primary cell and a second subframe configuration for one or more secondary cells. For example, UE 1502 receives a SIB1 that identifies the TDD uplink-downlink configurations of macro base station 1500 (configured as the PCell) and of small cell base station 1501 (configured as the SCell). The broadcasts indicate, for FIG. 15A, subframe configuration 1503 for macro base station 1500 and subframe configuration 1504 for small cell base station 1501, and for FIG. 15B, subframe configuration 1505 for macro base station 1500 and subframe configuration 1506 for small cell base station 1501.

At block 1401, a determination is made by the UE whether the number of downlink subframes configured for the SCell is greater than or equal to the number of downlink subframes of the PCell. For example, UE 1502 compares the number of downlink subframes between subframe configurations 1504 and 1506, for the SCell, small cell base station 1501, and subframe configurations 1503 and 1505, for the PCell, macro base station 1500, respectively.

If the UE determines that the number of downlink subframes of the SCell are greater than or equal to the number of downlink subframes of the PCell, then, at block 1402, the UE will determine a downlink error-control messaging timing for the primary cell and the secondary cells based on the second subframe configuration (for the SCells) and, at block 1403, will determine the uplink error control messaging timing for the primary cell and the secondary cells based on the first subframe configuration (for the PCells). For example, in the case where the SCells have more downlink subframes than the PCells, then, when self-scheduling is used, the PDSCH HARQ timing of both PCell, macro base station 1500, and SCell, small cell base station 1501, follows the uplink-downlink configuration of SCell broadcast in the SIB1 message, and the PUSCH scheduling and HARQ timing of both PCell and SCell follows the uplink-downlink configuration of PCell broadcast in the SIB1 message. Therefore, in FIG. 15A, UE 1502 will use the subframe configuration of macro base station 1500 for uplink HARQ feedback and will use the subframe configuration of small cell base station 1501 for downlink feedback.

If, however, the UE determines that the number of downlink subframes of the SCell are not greater than or equal to the number of downlink subframes of the PCell, then, at block 1405, the UE will determine a downlink error-control messaging timing for the primary and secondary cells based on the first subframe configuration (for the PCells) and, at block 1406, will determine the uplink error-control messaging timing for the primary and secondary cells based on the second subframe configuration (for the SCells). For example, in the case where the downlink subframes of the SCell are less than the downlink subframes of the PCell, the number of uplink subframes of the SCell will be greater than the uplink subframes of the PCell. Thus, when self-scheduling is used, then the PCell and SCell downlink HARQ timing follows the SIB1 uplink-downlink configuration of PCell, and the PCell and SCell uplink scheduling and HARQ timing follows the SIB1 uplink-downlink configuration of SCell. Therefore, in FIG. 15B, UE 1502 will use the subframe configuration of macro base station 1500 for downlink HARQ feedback and will use the subframe configuration of small cell base station 1501 for uplink HARQ feedback. This is to ensure HARQ-ACK is transmitted only on the common uplink or downlink subframes of the PCell (macro base station 1500) and SCell (small cell base station 1501).

If none of the aspects of the present disclosure are used to handle TDD carrier aggregation in which PCells and SCells operate with different uplink-downlink configurations, the straightforward option according to current specifications would be for the UE to follow the PCell configuration. If the subframe in the PCell is a downlink subframe, the UE shall not transmit any uplink signal or channel on a SCell in the same subframe. Similarly, if the subframe in the PCell is an uplink subframe, the UE is not expected to receive any downlink transmissions on a SCell in the same subframe. This solution would align with the current mechanism for half duplex UEs.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method of wireless communication, comprising:
monitoring for characteristics of a control signal related to subframe configuration for each time division duplex (TDD) cell of an aggregated set of TDD cells in a same band, wherein at least one TDD cell of the aggregated set of TDD cells in the same band has a different uplink-downlink configuration than at least one other TDD cell of the aggregated set of TDD cells in the same band;
determining, in response to detecting the characteristics of the control signal, one or more downlink subframes of the aggregated set of TDD cells in the same band based on the characteristics of the control signal, wherein the determining the one or more downlink subframes includes determining that one or more subframes of one or more secondary TDD cells of the aggregated set of TDD cells in the same band, corresponding to one or more subframes of a primary TDD cell of the aggregated set of TDD cells that are configured as uplink subframes, comprise downlink subframes, based on a lack of reception of one or more uplink grants for the one or more subframes of the one or more secondary TDD cells from the primary TDD cell of the aggregated set of TDD cells in the same band, wherein the one or more uplink grants from the primary TDD cell are user equipment (UE)-specific grants; and
receiving downlink transmissions from one or more TDD cells of the aggregated set of TDD cells in the same band during the determined one or more downlink subframes.

2. The method of claim 1, wherein the monitoring includes:
monitoring for one or more uplink grants from the primary TDD cell of the aggregated set of TDD cells in the same band, including monitoring for the one or more uplink grants for the one or more subframes of the one or more secondary TDD cells.

3. The method of claim 2, further including:
in response to detecting the one or more uplink grants from the primary TDD cell, one of:
discarding a predetermined number of last downlink symbols in a subframe from the one or more secondary TDD cells immediately preceding one or more uplink subframes to the one or more secondary TDD cells identified by the one or more uplink grants; or
dropping uplink transmissions to the primary TDD cell in the one or more uplink subframes identified by the one or more uplink grants.

4. The method of claim 1, wherein the monitoring includes:
monitoring for a configuration signal identifying a reference subframe configuration,
wherein the determining the one or more downlink subframes includes:
determining, based on the reference subframe configuration, one or more secondary TDD cell downlink subframes of one or more secondary TDD cells of the aggregated set of TDD cells in the same band that are used for downlink transmission by the one or more secondary TDD cells; and
determining, based on the reference subframe configuration, one or more uplink subframes of a primary TDD cell of the aggregated TDD cells in the same band that are used for uplink transmission by a user equipment (UE).

5. The method of claim 4,
wherein one or more reference downlink subframes of the reference subframe configuration are a subset of one or more configured downlink subframes of the one or more secondary TDD cells and a superset of one or more configured downlink subframes of the primary TDD cell, and wherein one or more reference uplink subframes of the reference subframe configuration are a subset of one or more configured uplink subframes of the primary TDD cell and a superset of one or more configured uplink subframes of the one or more secondary TDD cells.

6. The method of claim 5, wherein the reference subframe configuration is one of:
addressed specifically to the UE; or
common to one or more other UEs within a same coverage area of the aggregated set of TDD cells in the same band.

7. The method of claim 1, further including:
receiving a broadcast configuration message identifying a subframe configuration for a primary TDD cell and one or more secondary TDD cells of the aggregated set of TDD cells in the same band,
wherein the monitoring includes:
monitoring for a dynamic reconfiguration signal identifying a new subframe configuration for the one or more secondary TDD cells,
wherein the determining the one or more downlink subframes includes:
determining one or more secondary TDD cell downlink subframes of the one or more secondary TDD cells based on the dynamic reconfiguration signal; and
determining one or more primary TDD cell downlink subframes of the primary TDD cell based on the broadcast configuration message.

8. The method of claim 7, wherein the dynamic reconfiguration signal is common to one or more other UEs within a same coverage area of the aggregated set of TDD cells in the same band.

9. The method of claim 7, further including:
receiving from the primary TDD cell a subframe set dependent channel state measurement configuration for one or more secondary TDD cell downlink subframes; and
measuring the one or more secondary TDD cell downlink subframes using the subframe set dependent channel state measurement configuration, wherein the subframe set dependent channel state measurement configuration reduces effect of uplink interference from the primary TDD cell.

10. A method of wireless communication, comprising:
receiving a broadcast message indicating a first subframe configuration of a primary cell and a second subframe configuration for one or more secondary cells in a same band as the primary cell;
in response to a number of secondary cell downlink subframes of the one or more secondary cells being greater than or equal to a number of primary cell downlink subframes of the primary cell:
determining a downlink error-control messaging timing for the primary cell and the one or more secondary cells based on the second subframe configuration; and
determining an uplink error-control messaging timing for the primary cell and the one or more secondary cells based on the first subframe configuration;
in response to a number of secondary cell uplink subframes of the one or more secondary cells being greater than or equal to a number of primary cell uplink subframes of the primary cell:
determining the downlink error-control messaging timing for the primary cell and the one or more secondary cells based on the first subframe configuration; and
determining the uplink error-control messaging timing for the primary cell and the one or more secondary cells based on the second subframe configuration; and
conducting error-control messaging according to the downlink error-control messaging timing and the uplink error-control messaging timing.

11. A non-transitory computer-readable medium having program code recorded thereon, comprising:
program code for causing a computer to monitor for characteristics of a control signal related to subframe configuration for each time division duplex (TDD) cell of an aggregated set of TDD cells in a same band, wherein at least one TDD cell of the aggregated set of TDD cells in the same band has a different uplink-downlink configuration than at least one other TDD cell of the aggregated set of TDD cells in the same band;
program code for causing the computer to determine, in response to detecting the characteristics of the control signal, one or more downlink subframes of the aggregated set of TDD cells in the same band based on the characteristics of the control signal, wherein the program code for causing the computer to determine the one or more downlink subframes includes program code for causing the computer to determine that one or more subframes of one or more secondary TDD cells of the aggregated set of TDD cells in the same band, corresponding to one or more subframes of a primary TDD cell of the aggregated set of TDD cells that are configured as uplink subframes, comprise downlink subframes, based on a lack of reception of one or more uplink grants for the one or more subframes of the one or more secondary TDD cells from the primary TDD cell of the aggregated set of TDD cells in the same band, wherein the one or more uplink grants from the primary TDD cell are user equipment (UE)-specific grants; and
program code for causing the computer to receive downlink transmissions from one or more TDD cells of the aggregated set of TDD cells in the same band during the determined one or more downlink subframes.

12. The non-transitory computer-readable medium of claim 11, wherein the program code for causing the computer to monitor includes:
program code for causing the computer to monitor for one or more uplink grants from the primary TDD cell of the aggregated set of TDD cells in the same band including monitoring for the one or more uplink grants for the one or more subframes of the one or more secondary TDD cells.

13. The non-transitory computer-readable medium of claim 12, further including:
program code, executable in response to detecting the one or more uplink grants from the primary TDD cell, one of:
for causing the computer to discard a predetermined number of last downlink symbols in a subframe from the one or more secondary TDD cells immediately preceding one or more uplink subframes to the one or more secondary TDD cells identified by the one or more uplink grants; or
for causing the computer to drop uplink transmissions to the primary TDD cell in the one or more uplink subframes identified by the one or more uplink grants.

14. The non-transitory computer-readable medium of claim 11, wherein the program code for causing the computer to monitor includes:

program code for causing the computer to monitor for a configuration signal identifying a reference subframe configuration,
wherein the program code for causing the computer to determine the one or more downlink subframes includes:
program code for causing the computer to determine, based on the reference subframe configuration, one or more secondary TDD cell downlink subframes of one or more secondary TDD cells of the aggregated set of TDD cells in the same band that are used for downlink transmission by the one or more secondary TDD cells; and
program code for causing the computer to determine, based on the reference subframe configuration, one or more uplink subframes of a primary TDD cell of the aggregated TDD cells in the same band that are used for uplink transmission by a user equipment (UE).

15. The non-transitory computer-readable medium of claim 14,
wherein one or more reference downlink subframes of the reference subframe configuration are a subset of one or more configured downlink subframes of the one or more secondary TDD cells and a superset of one or more configured downlink subframes of the primary TDD cell, and
wherein one or more reference uplink subframes of the reference subframe configuration are a subset of one or more configured uplink subframes of the primary TDD cell and a superset of one or more configured uplink subframes of the one or more secondary TDD cells.

16. The non-transitory computer-readable medium of claim 15, wherein the reference subframe configuration is one of:
addressed specifically to the UE; or
common to one or more other UEs within a same coverage area of the aggregated set of TDD cells in the same band.

17. The non-transitory computer-readable medium of claim 11, further including:
program code for causing the computer to receive a broadcast configuration message identifying a subframe configuration for a primary TDD cell and one or more secondary TDD cells of the aggregated set of TDD cells in the same band,
wherein the program code for causing the computer to monitor includes:
program code for causing the computer to monitor for a dynamic reconfiguration signal identifying a new subframe configuration for the one or more secondary TDD cells,
wherein the program code for causing the computer to determine the one or more downlink subframes includes:
program code for causing the computer to determine one or more secondary TDD cell downlink subframes of the one or more secondary TDD cells based on the dynamic reconfiguration signal; and
program code for causing the computer to determine one or more primary TDD cell downlink subframes of the primary TDD cell based on the broadcast configuration message.

18. The non-transitory computer-readable medium of claim 17, wherein the dynamic reconfiguration signal is common to one or more other UEs within a same coverage area of the aggregated set of TDD cells in the same band.

19. The non-transitory computer-readable medium of claim 17, further including:
program code for causing the computer to receive from the primary TDD cell a subframe set dependent channel state measurement configuration for one or more secondary TDD cell downlink subframes; and
program code for causing the computer to measure the one or more secondary TDD cell downlink subframes using the subframe set dependent channel state measurement configuration, wherein the subframe set dependent channel state measurement configuration reduces effect of uplink interference from the primary TDD cell.

20. An apparatus configured for wireless communication, the apparatus comprising:
at least one processor; and
a memory coupled to the at least one processor,
wherein the at least one processor is configured:
to monitor for characteristics of a control signal related to subframe configuration for each time division duplex (TDD) cell of an aggregated set of TDD cells in a same band, wherein at least one TDD cell of the aggregated set of TDD cells in the same band has a different uplink-downlink configuration than at least one other TDD cell of the aggregated set of TDD cells in the same band;
to determine, in response to detecting the characteristics of the control signal, one or more downlink subframes of the aggregated set of TDD cells in the same band based on the characteristics of the control signal, wherein the configuration of the at least one processor to determine the one or more downlink subframes includes configuration of the at least one processor to determine that one or more subframes of one or more secondary TDD cells of the aggregated set of TDD cells in the same band, corresponding to one or more subframes of a primary TDD cell of the aggregated set of TDD cells that are configured as uplink subframes, comprise downlink subframes, based on a lack of reception of one or more uplink grants for the one or more subframes of the one or more secondary TDD cells from the primary TDD cell of the aggregated set of TDD cells in the same band, wherein the one or more uplink grants from the primary TDD cell are user equipment (UE)-specific grants; and
to receive downlink transmissions from one or more TDD cells of the aggregated set of TDD cells in the same band during the determined one or more downlink subframes.

21. The apparatus of claim 20, wherein the configuration of the at least one processor to monitor includes configuration to monitor for one or more uplink grants from the primary TDD cell of the aggregated set of TDD cells in the same band including monitoring for the one or more uplink grants for the one or more subframes of the one or more secondary TDD cells.

22. The apparatus of claim 21, further including configuration of the at least one processor, in response to detecting the one or more uplink grants from the primary TDD cell, one of:
to discard a predetermined number of last downlink symbols in a subframe from the one or more secondary TDD cells immediately preceding one or more uplink subframes to the one or more secondary TDD cells identified by the one or more uplink grants; or to drop uplink transmissions to the primary TDD cell in the one or more uplink subframes identified by the one or more uplink grants.

23. The apparatus of claim 20, wherein the configuration of the at least one processor to monitor includes configuration to monitor for a configuration signal identifying a reference subframe configuration,
- wherein the configuration of the at least one processor to determine the one or more downlink subframes includes configuration to determine, based on the reference subframe configuration, one or more secondary TDD cell downlink subframes of one or more secondary TDD cells of the aggregated set of TDD cells in the same band that are used for downlink transmission by the one or more secondary TDD cells; and
- configuration of the at least one processor to determine, based on the reference subframe configuration, one or more uplink subframes of a primary TDD cell of the aggregated TDD cells in the same band that are used for uplink transmission by a user equipment (UE).

24. The apparatus of claim 23,
- wherein one or more reference downlink subframes of the reference subframe configuration are a subset of one or more configured downlink subframes of the one or more secondary TDD cells and a superset of one or more configured downlink subframes of the primary TDD cell, and
- wherein one or more reference uplink subframes of the reference subframe configuration are a subset of one or more configured uplink subframes of the primary TDD cell and a superset of one or more configured uplink subframes of the one or more secondary TDD cells.

25. The apparatus of claim 24, wherein the reference subframe configuration is one of:
- addressed specifically to the UE; or
- common to one or more other UEs within a same coverage area of the aggregated set of TDD cells in the same band.

26. The apparatus of claim 20, further including configuration of the at least one processor to receive a broadcast configuration message identifying a subframe configuration for a primary TDD cell and one or more secondary TDD cells of the aggregated set of TDD cells in the same band,
- wherein the configuration of the at least one processor to monitor includes configuration to monitor for a dynamic reconfiguration signal identifying a new subframe configuration for the one or more secondary TDD cells,
- wherein the configuration of the at least one processor to determine the one or more downlink subframes includes:
  - configuration of the at least one processor to determine one or more secondary TDD cell downlink subframes of the one or more secondary TDD cells based on the dynamic reconfiguration signal; and
  - configuration of the at least one processor to determine one or more primary TDD cell downlink subframes of the primary TDD cell based on the broadcast configuration message.

27. The apparatus of claim 26, wherein the dynamic reconfiguration signal is common to one or more other UEs within a same coverage area of the aggregated set of TDD cells in the same band.

28. The apparatus of claim 26, further including configuration of the at least one processor:
- to receive from the primary TDD cell a subframe set dependent channel state measurement configuration for one or more secondary TDD cell downlink subframes; and
- to measure the one or more secondary TDD cell downlink subframes using the subframe set dependent channel state measurement configuration, wherein the subframe set dependent channel state measurement configuration reduces effect of uplink interference from the primary TDD cell.

* * * * *